Sept. 1, 1936.  H. ZUR NIEDEN  2,052,861
BOOKKEEPING MACHINE
Filed Oct. 4, 1934  5 Sheets-Sheet 1

Inventor:
HEINZ ZUR NIEDEN
by Knight Bros.
Attorneys.

Sept. 1, 1936.   H. ZUR NIEDEN   2,052,861
BOOKKEEPING MACHINE
Filed Oct. 4, 1934   5 Sheets-Sheet 5

Inventor:
HEINZ ZUR NIEDEN
by Knight Bro.
Attorneys.

Patented Sept. 1, 1936

2,052,861

UNITED STATES PATENT OFFICE 2,052,861

BOOKKEEPING MACHINE

Heinz zur Nieden, Bielefeld, Germany, assignor to Anker-Werke Aktiengesellschaft, Bielefeld, Germany Application October 4, 1934, Serial No. 746,916
In Germany October 7, 1933

20 Claims. (Cl. 101—93)

The instant invention relates to a bookkeeping machine, having a printing mechanism in which account cards or corresponding vouchers are printed, which are designated and identified according to numerals, letters, or other symbols.

The object of the invention is to prevent the insertion of the wrong account card into the printing mechanism to preclude the printing thereof by mistake.

The invention consists particularly in the provision of notches or apertures in the account card, which openings represent the account number or analogous designation, and which cooperate with a locking apparatus, which interrupts the machine drive when the account designation which is set upon the machine does not correspond to that of the account card which is inserted in the machine. According to the embodiment of the invention which is illustrated in the accompanying drawings and described hereinafter, a disk having a plurality of pins or pegs thereon, is adjusted by the differential mechanism of the machine in accordance with the setting of the account designation thereon, the pegs of which cooperate with corresponding openings in the account card. In accordance with the invention, a locking apparatus is controlled by this pegged disk operating as a feeling device, which effects an interruption of the machine operation when the pegs are unable to penetrate through the corresponding openings in the account card.

By means of the instant invention, an erroneous or fraudulent impression of a wrong account card is prevented, because the machine operation is interrupted before the execution of the printing operation, and the correct card may be substituted for the erroneously inserted one.

Figure 1:
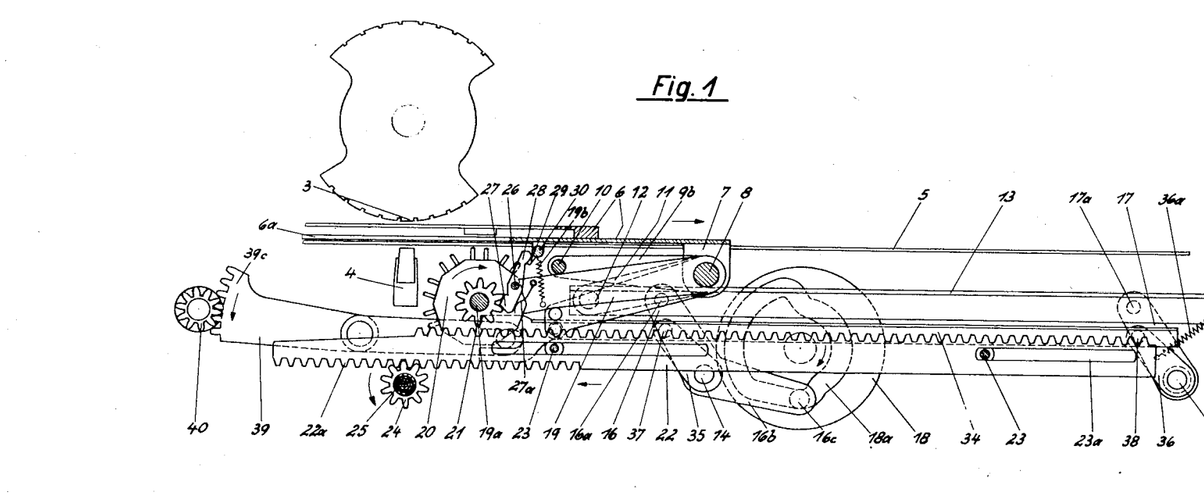
Figure 1 is a side view of the printing mechanism.
Figure 2:
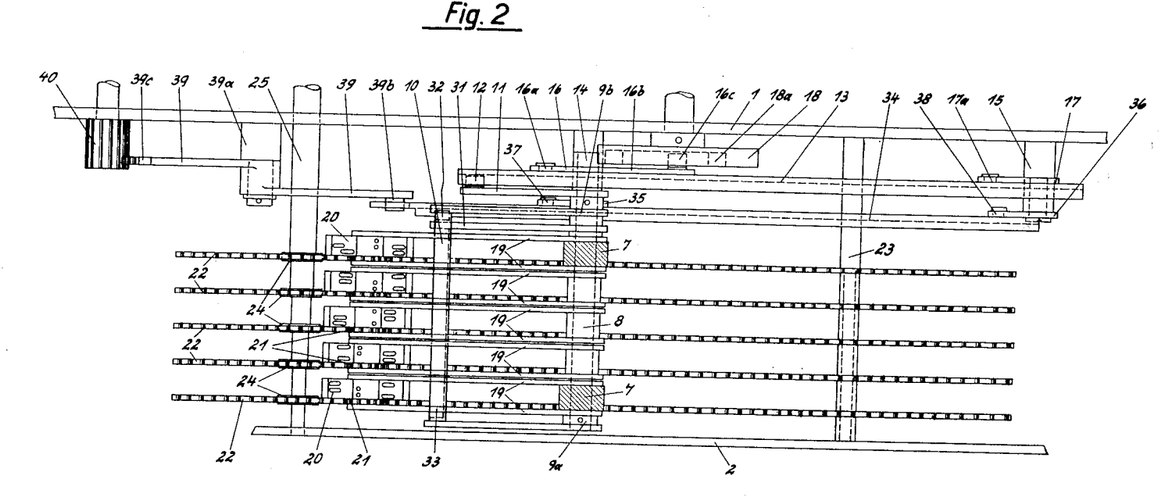
Figure 2 is a plan view thereof.

A group of printing type wheels 3 (Fig. 1) are mounted between the side walls 1 and 2 of the machine (Figs. 2, 5 and 7), and a printing platen 4 cooperates with these type wheels. A fixed printing table 5 (Fig. 1) is also arranged between the walls 1 and 2, upon which a table 6 is shiftable in a longitudinal direction. Two bearings 7 are provided on table 6, which extend through an opening in table 5 (Fig. 1). A shaft 8 is rotatably mounted in the bearings 7, upon which are fixed two lever arms 9a and 9b, which are connected with each other by means of a rod 10. A second lever arm 11 is rigidly fixed to the lever 9b and carries a roller 12, which upon the shifting of the table 6, glides along on an angularly-shaped rail 13 (Fig. 1). Two bolts 14 and 15 are fixed upon the side wall 1, upon which are mounted lever arms 16 and 17, respectively. The ends of these lever arms embrace, with corresponding openings, the pins 16a and 17a, which are fixed upon the angular rail 13. The angular arm 16 is extended on the right to a second lever arm 16b which carries a roller 16c which engages in a cam groove 18a of a cam disk 18.

Figure 10:
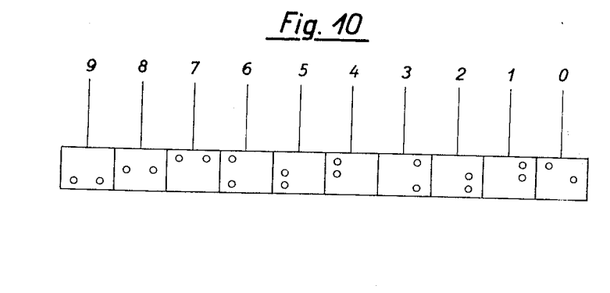
Figure 10 is a developed view of one of the pegged disks.

Five swinging arms 19, furthermore, are pivotally mounted upon the shaft 8, the free ends of which are connected by means of a cross-bar 19a. Disks 20, provided with pins or pegs and designed to operate as a feeling device, are rotatably mounted upon the cross-bar 19a and the disks are formed prismatically, having a polygonally shaped cross section. The disks 20 carry pegs upon the lateral surfaces thereof, which are subdivided in the manner illustrated in Fig. 10 and represent the numerals 0–9. The disks 20 are each connected with a toothed pinion 21, which upon the swinging downwardly of the disk 20, comes into engagement with a toothed bar 22. The toothed bars 22 are shiftably arranged upon the bolts 23 mounted in the side walls 1 and 2 by means of longitudinal slots 23a in the former. The lower edge of each of the toothed bars 22 is provided with a toothed portion 22a (Fig. 1), in which engages a toothed pinion 24 which is connected by means of a hollow shaft 25 with the differential mechanism of the machine in the manner described hereinafter.

Each of the swinging arms 19, which abut against the toothed pinions 21, carries a pin 26 (Fig. 1), upon which a pawl 27 is pivotally mounted, the nose of which engages in the teeth of the pinion 21 under the action of a leaf spring 27a, and thereby holds each disk 20 in its adjusted position. The rear end 28 of each pawl 27 cooperates with a pin 29. The pins 29 are arranged in a cross-bar 30 mounted in the longitudinally shiftable table 6. Upon the swinging of the arms 19 downwardly, the pawls 27 render free the toothed pinions 21 so that the disks 20 may be adjusted by means of the toothed bars 22.

Figure 3:
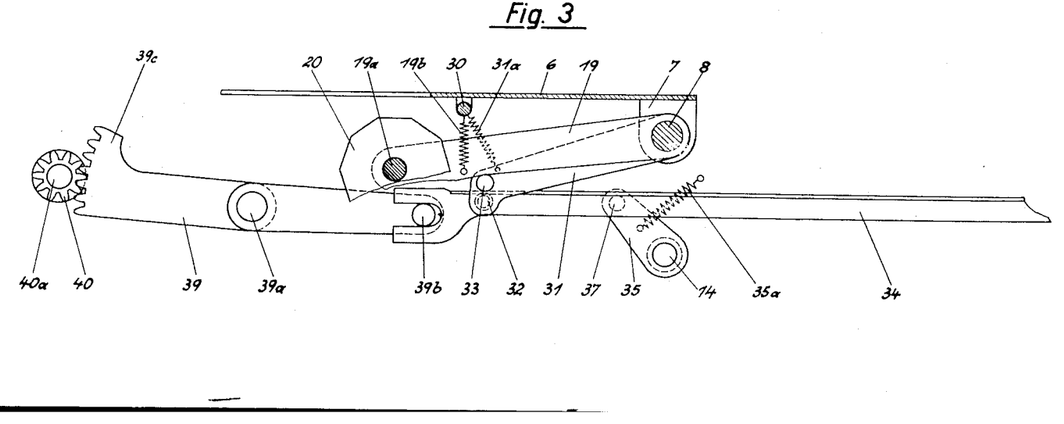
Figure 3 is a side view of the transmission mechanism for the locking device.
Figure 7:
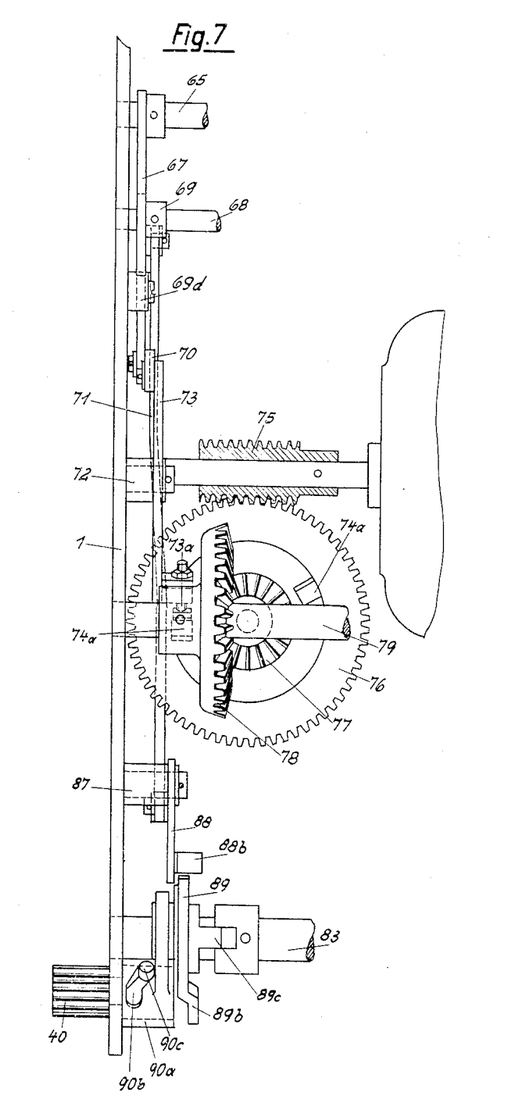
Figures 7 and 8 are front views of parts of Figure 6.

Finally, an arm 31 (Fig. 3) is rotatably mounted upon the shaft 8, which arm carries a roller 32 and a bar 33. The bar 33 abuts from below against the swinging arms 19 by the effect of a spring 31a. The roller 32 slides along the angular projection of the angular rail 34 at the shifting of the table 6. Levers 35 and 36 are freely rotatable upon bolts 14 and 15, respectively, and embrace by means of corresponding recesses bolts 37 and 38 of the angular rail 34. Springs 35a and 36a engage lever arms 35 and 36, respectively, and have the effect of pulling the angular rail 34 to the right and thereby upwardly (Figs. 1 and 3). The angular rail 34 is bifurcated at its left end (Fig. 3), and embraces with its fork-shaped end a roller 39b, which is carried by toothed segment 39, which in turn is rotatably mounted upon bolt 39a. The teeth 39c of the toothed segment 39 mesh with a toothed pinion 40, the axle 40a of which extends through the wall 1 (Fig. 7).

Between the wall 1 adjacent the printing mechanism and the side wall 41 of the machine, key yokes 43 are mounted upon assembly rods 42 (Fig. 4) at suitable distances for a convenient use of the key area. Key shanks 43a are slidably arranged in the usual manner in the key yokes 43. The account number is adjusted in known manner with the keys illustrated having the numerical values of 0–9. Likewise, in known manner, a differential mechanism cooperates with the key shanks 43a, which in general consists of a driving member 45 fixed upon a drive shaft 44, a setting segment 46, and a coupling device. By means of the coupling device, the setting segment 46 is coupled with the driving member 45 until a rotatable coupling pawl 49 upon pin 48 strikes against the depressed key in the course of the forward movement of the driving member. For example, in Fig. 4, the key "7" is designated in its depressed position. During the preceding downward movement of the driving member 45, the setting segment 46 is taken down to its zero position from the position it assumed in the previous machine operation by means of bolt 51a which is mounted upon arm 51 rotatable on pin 50. The bolt 51a cooperates thereby with a recess 51b of the driving member 47. The zero stop pawls 53 are rotatably mounted upon a shaft 52a. Upon the depression of a key, the key shank 43 is moved inwardly and by means of a toothed segment, which is not shown, the flattened pin 53a moves out of the path of the yielding yoke 47a which is shiftably mounted upon the setting segment 46, so that at the forward movement, the setting segment 46 may be taken along unhindered until the stop of the coupling pawl strikes the depressed key.

A differential mechanism of this kind is described in the German Patent 181,791.

Figures 4, 5:
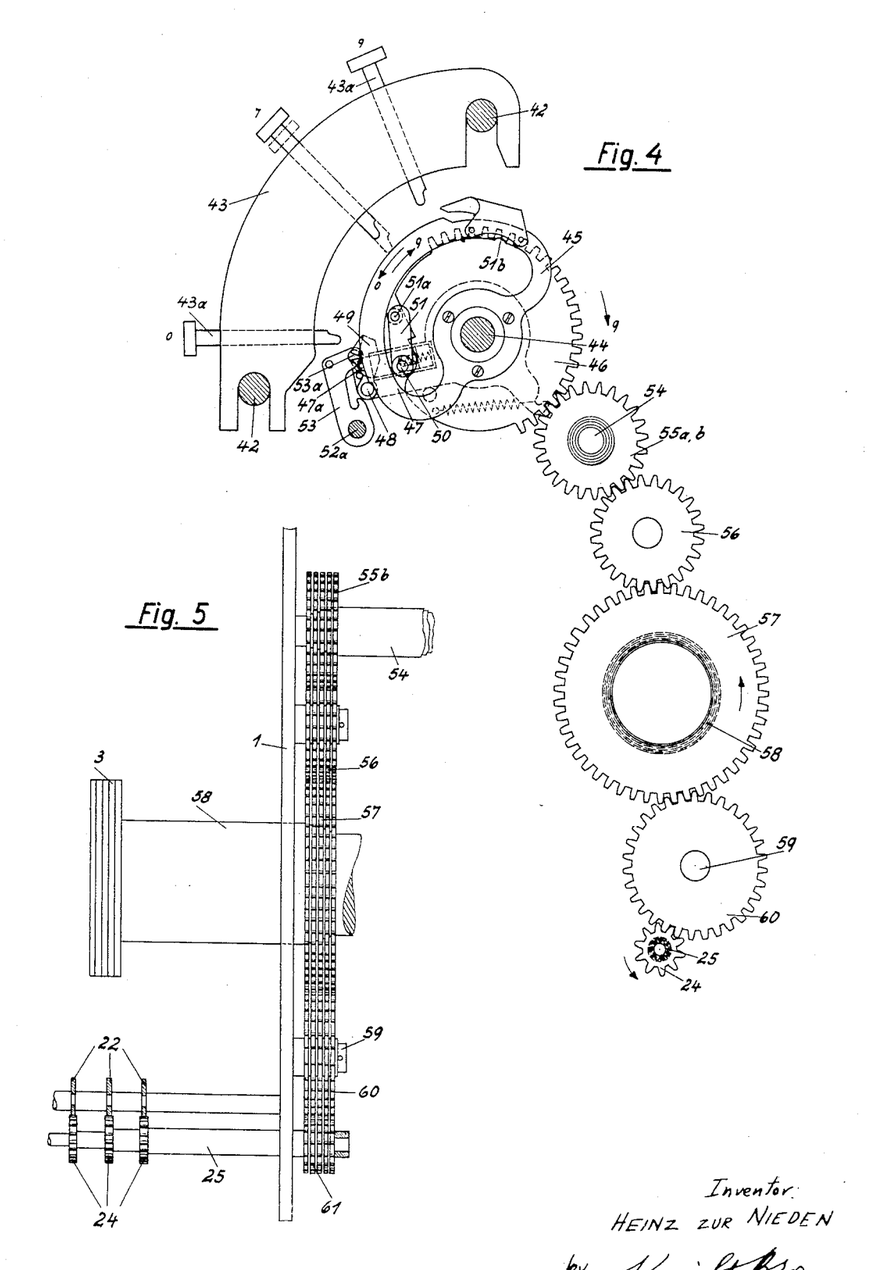
Figure 4 is a side view of the account numeral key bank.
Figure 5 is a front view of Figure 4.

The setting segments 46 transmit their movement to gear wheels 55a which are connected by means of hollow shafts with gear wheels 55b (Figs. 4 and 5). The movement from the former is imparted through gear wheels 56 and 57 through hollow shafts 58 to the type wheels 3 (Figs. 1 and 5), so that the type wheels are adjusted to the account number in accordance with the depressed keys. Gear wheels 60 are in engagement with gear wheels 57, and are mounted upon the bolt 59 on the wall 1 of the machine. The gear wheels 60 transmit the setting movement by means of the gear wheels 61 and the hollow shaft system 25 to the above-mentioned pinions 24, which adjust the toothed bars 22 and the pegged disks 20.

Figure 8:
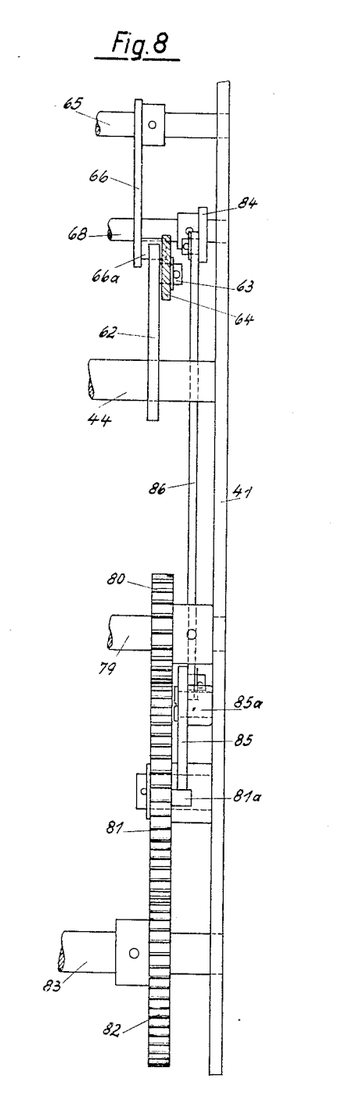

The apparatus for throwing in and arresting the drive is arranged between walls 1 and 41 (Figs. 6–8) in the following manner:

A throw-in lever 62 is pivotally mounted on a shaft 44 (Fig. 6), which lever is jointedly connected by means of pin 63 with the shank 64 of the motor key 64a. An arm 66 is fixed upon a shaft 65, the roller 66a of which is pulled against the inclined surface 62a of the throw-in lever 62 by means of the spring 66b. A catch lever 67 is further fixed upon the shaft 65 adjacent the side wall 1 (Fig. 7), the nose 67a of which cooperates with an arm 69a of a multi-armed actuating lever 69. The actuating lever 69 is fixed upon a shaft 68, which is rotatably mounted in the side walls 1 and 41. A spring 69e engages the arm 69a, which, upon the freeing thereof by the catch lever 67, rocks the multi-armed lever 69 counter-clockwise until the arm 69a strikes the felt buffer 69d. A link 70 is attached to the downwardly extending arm 69b of arm 69, the free end of which is jointedly connected with the upwardly extending arm of a double-armed lever 73. The double-armed lever 73 is rotatably mounted upon the bolt 72 in the side wall 1. The downwardly extending arm of lever 73 is provided with an adjusting screw 73a, which cooperates with a rectangular pin 74a of the motor coupling disk 74. A worm wheel 75 is keyed upon the motor shaft (Fig. 7), which transmits the driving movement through another worm wheel 76 to the coupling disk 74 by means of parts well known in the art and not shown.

By means of the bevel wheel 77 connected with the coupling disk 74, the driving movement is transmitted to a shaft 79 through a bevel wheel 78 and from the shaft 79 through gear wheels 80 and 81 to a gear wheel 82, which is fixed upon shaft 83.

A lever arm 84 is fixed upon the shaft 68 near the right side wall 41 (Fig. 8), which is jointedly connected by means of a draft rod 86 with a locking lever 85 mounted upon bolt 85a. The free end of the locking lever 85 cooperates with two rectangular pins 81a disposed on the gear wheel 81.

An angular lever 88 is rotatably mounted upon the bolt 87 fixed in the wall 1 (Figs. 6 and 7), one arm of which lever is jointedly connected with the lug 69c of the multi-armed lever 69 by means of draft rod 71. The other arm of the angular lever 88 carries a roller 88b, which cooperates with a cam disk 89, which is axially shiftable upon the shaft 83. The cam disk 89 has two cams or arms 89a and 89b, the latter one of which is bent (Fig. 7). It is coupled for rotation with the shaft 83 by means of a clutch coupling 89c. Its lateral shifting on the shaft 83 is effected by means of an annular groove in the hub 89e with a forked arm 90 engaging therein, which is arranged on a bush 90a and which has a curved groove 90b. A roller 90c engages in the curved groove 90b and the former is rigidly connected with the shaft of the gear wheel 40. The gear wheel 40 is connected as described above, by means of toothed segments 39 (Fig. 3) with the throw-in apparatus for the pegged disks 20. The described apparatus operates in the following manner:

The number of the account card is adjusted by means of account keys 43a in known manner. For example, in Fig. 9, an account card with a number 12345 is illustrated. Likewise, in known manner, the amount is adjusted in the amount setting area, and the character of the amount is set by means of special keys or special setting levers.

Thereupon, the account card is inserted in the opening 6a of the movable printing table 6, and the printing table is adjusted to the line to be printed, for example, by means of a manual setting lever of the setting field. Thereby, the printing table 6 is shifted to the right, (Fig. 1), until the appurtenant line is disposed below the printing types 3. At the same time of the movement of the printing table 6, the swing arms 19, which are mounted in the bearing lugs 7 of the printing table, and the pegged disks 20, are moved to the right.

Figures 6, 9:
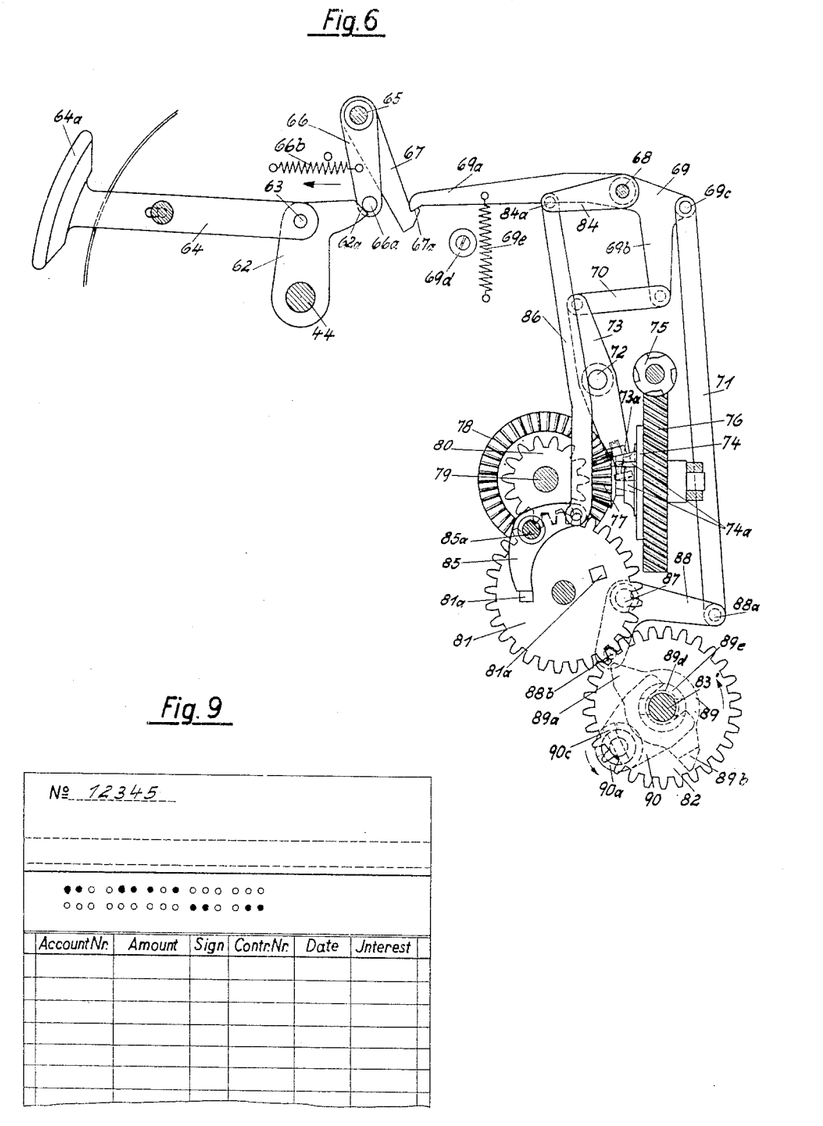
Figure 6 is a side view of the locking mechanism for the drive.
Figure 9 shows an apertured account card.

Upon the depression of the motor key 64a, the inclined surface 62a moves away from the pin 66a (Fig. 6). The nose of the catch lever 67 rocks to the left by the effect of the spring 66b, so that the arm 69a is rendered free and the multi-armed lever 69 rocks in a counterclockwise direction by the effect of the spring 69e, until the arm 69a comes to abut against the buffer 69d. The adjusting screw 73a of the lever 73 is therefore removed from the path of the rectangular pin 74a through the lever arm 69b, and the drive is coupled with the motor, the circuit of which is closed at the same time.

The rotation of lever 69 causes, by means of the lug 69c and the draft rod 71, the roller 88b of the angular lever 88 to be brought into the path of the cam disk 89. The lever 84, also fixed upon the shaft 68, is rocked at the same time with lever 69 and the angular lever 85 is rocked from the path of rectangular pin 81a through draft rod 86, so that the drive may operate without hindrance.

At the beginning of the driving operation, the cam disk 18 (Fig. 1) is actuated and thereby the angular rail 13, which is supported by arms 16 and 17, is moved downwardly. The cross bar 10 as well as the lever arms 11 and 9a and 9b, which are rigidly connected with one another, are also moved downwardly with the angular rail 13, by means of roller 12, whereby all the swing arms 19 are actuated together and the gear pinions 21 of the pegged disks 20 are thrown into engagement with the toothed bars 22.

As described above in the short description of the actuating mechanism, the driving member 45 first moves back to its zero position and carries along therewith the actuating segment 46 from the position it assumed in the previous machine operation into its zero position. Thereupon the actuating segment is carried forward until the stop of the coupling pawl 49 strikes the depressed key, so that in the described manner, the type wheels 3 and therewith the pegged disks 20 are adjusted corresponding to the depressed keys.

During the setting operation, the cam disk 18 is rotated so far that the angular rail 13 is again lifted, as may be seen from the form of the cam groove 18a, beyond the normal position shown in Fig. 1. The swing arms 19 are therefore moved upwardly by the operation of springs 19b. Also the lever 31 is pulled upwardly by the action of spring 31a and therewith the rail 34 over the roller 32.

In case the correct account card has been inserted, the pegs of the pegged disks 20 are not prevented from extending into the corresponding apertures of the account card, since the bar 10 is now substantially in a higher position than in the normal position illustrated in Fig. 1. The movement, in this case, is limited by the contact of the prismatic surfaces of the pegged disks 20 against the account card. The rail 34 transfers its upward movement to the toothed pinion 40 by means of the toothed segment 39. The rotation of the toothed pinion 40 effects the rocking of the roller pin 90c, and through this pin, a lateral shifting of the cam disk 89, by means of which the lower bent cam 89b is moved out of the path of the roller 88b. Under these circumstances, the machine operation is therefore executed without interruption.

On the other hand, in case the incorrect account card has been inserted, the swing arms 19 can swing only a limited extent, until the pegs of the pegged disks 20 are prevented from further movement by the account card. Since the extent of this swinging movement is substantially less than that when the pegs penetrate the apertures of the account card, an axial shifting of the lugged disk 89 is not attained, and the second bent cam 89b of cam disc 89 remains in the path of the roller 88b. In this case, before the printing platen 4 becomes effective, the cam 89b strikes against the roller 88b in the course of rotation of the shaft 83 and serves to rock the angular lever 88, thereby imparting a clockwise rotation to multi-armed lever 69 through draft rod 71. By means of the rotation of the multi-armed lever 69, the locking lever 85 is moved in front of the rectangular pin 81a and the adjusting screw 73a before the rectangular pin 74a. As soon as the rectangular pins 81a and 74a strike against their corresponding locking parts, the drive of the motor is uncoupled in known manner and the machine operation is interrupted. Then the correct account card may be substituted for the wrong one, the correct account card being first inserted below the wrong card before the latter is taken out. As soon as the pegs of the pegged disks 20 are able to penetrate the apertures of the correct card, the locks 85 and 73a are automatically removed and the machine operation is executed to its conclusion.

Instead of the apertures, notched marginal cuts may be provided on the card, such as are known for index cards. Thereby, the space required for four notches exposed in a row adjacent each other suffices, which by means of various positionings of the notches symbolizes one of the characters 0-9. By this arrangement, it is possible that the necessary exactitude of the adjustment is diminished.

The locking arrangement described above works in the same manner when the correct account card is inserted but when the wrong account number is set on the machine.

Although the invention has been described in conjunction with account cards having numerical designations, it is also applicable to any other form of identification of the cards, such as by letters or symbols, the setting area of the machine for the account card designations, conforming thereto correspondingly.

Having described my invention, what I claim is:

1. In a machine of the class described, a printing device adapted to print upon a voucher inserted therein, said voucher having identifying elements corresponding to a predetermined system of designations, manually operative setting means on said machine corresponding to said system of designations, a feeling device controlled by said setting means and cooperable with the identifying elements of the voucher, driving means for actuating said printing device, and means for interrupting the operation of said driving means responsive to the non-coincidence of the identifying elements of the voucher with the feeling device as adjusted by said setting means.

2. The combination claimed in claim 1 wherein said feeling device comprises disks each having a plurality of pegs, said disks being adjustable by said setting means, said pegs adapted to penetrate through the openings in the voucher at the coincidence of the sequence of openings in the voucher with the sequence of the pegs controlled by said setting means.

3. In a machine of the class described, a printing device adapted to print upon a voucher inserted therein, said voucher having openings therein corresponding to a predetermined system of designations, setting means on said machine corresponding to said system of designations, type wheels corresponding to said designations controlled by said setting means, a feeling device controlled by said setting means comprising a plurality of disks each having a plurality of pegs, said disks being adjustable by said setting means concomitantly with said type wheels, said pegs adapted to penetrate through the openings in the voucher at the coincidence of the sequence of openings in the voucher with the sequence of pegs controlled by said setting means, driving means for actuating said printing device, and means for interrupting the operation of said driving means responsive to the non-coincidence of the openings in the voucher with the pegs of the feeling device.

4. In a machine of the class described, a printing device adapted to print upon a voucher inserted therein, said voucher having identifying elements thereon corresponding to a predetermined system of designations, manually operative setting means on said machine corresponding to said system of designations, driving means for actuating said printing device, and means for interrupting the operation of said driving means responsive to the non-conformity of the designation formed by the identifying elements on the voucher inserted in the machine with the designation adjusted by said setting means, and for permitting the operation of said driving means to effect the printing operation responsive to the conformity of the designation on the voucher with that adjusted by said setting means.

5. In a machine of the class described, a printing device adapted to print upon a voucher inserted therein, said voucher having openings therein corresponding to a predetermined system of designations, setting means on said machine corresponding to said system of designations, type wheels corresponding to said designations controlled by said setting means, a feeling device controlled by said setting means comprising a plurality of disks each having a plurality of pegs, said disks being adjustable by said setting means concomitantly with said type wheels, said pegs adapted to penetrate through the openings in the voucher at the coincidence of the sequence of openings on the voucher with the sequence of pegs controlled by said setting means, driving means for actuating said printing device, means for contacting said pegs with the voucher subsequent to the initiation of said driving means but prior to the operation of said printing device, means for interrupting the operation of said driving means responsive to the non-coincidence of the openings in the voucher with the pegs of the feeling device and for permitting the operation of said driving means at the coincidence of the openings with the pegs to effect the printing operation.

6. In a machine of the class described, a printing device adapted to print upon a voucher inserted therein, said voucher having openings therein corresponding to a predetermined system of designations, setting means on said machine corresponding to said system of designations, a feeling device controlled by said setting means comprising a plurality of disks each having a plurality of pegs, said disks being adjustable by said setting means, said pegs adapted to penetrate through the openings in the voucher at the coincidence of the sequence of openings in the voucher with the sequence of pegs controlled by said setting means, driving means for actuating said printing device, means for contacting said pegs with the voucher subsequent to the initiation of said driving means but prior to the operation of said printing device, an actuating member controlled by the movement of said pegs towards the voucher, said member adapted to move a greater extent when penetration of the voucher takes place than when said penetration is blocked, and means for interrupting and permitting the operation of said driving means controlled by the extent of movement of said member.

7. In a machine of the class described, a shiftable printing table, a printing device adapted to print upon a voucher inserted in said table, said voucher having openings therein corresponding to a predetermined system of designations, setting means on said machine corresponding to said system of designations, a feeling device controlled by said setting means comprising a frame pivotally mounted on said printing table, and a plurality of disks, each having a plurality of pegs, mounted in said frame, said disks being adjustable by said setting means, said pegs adapted to penetrate through the openings in the voucher at the coincidence of the sequence of openings in the voucher with the sequence of pegs controlled by said setting means, driving means for actuating said printing device, and means for interrupting the operation of said driving means responsive to the non-coincidence of the openings in the voucher with the pegs of the feeling device.

8. In a machine of the class described, a shiftable printing table, a printing device adapted to print upon a voucher inserted in said table, said voucher having openings therein corresponding to a predetermined system of designations, setting means on said machine corresponding to said system of designations, a feeling device controlled by said setting means comprising a frame pivotally mounted on said printing table and a plurality of disks, each having a plurality of pegs, mounted in said frame, a pinion connected with each of said disks, differentially actuated gears controlled by said setting means, means for rocking said pinions into engagement with said gears at the beginning of the machine operation to correspondingly set said disks, said pegs adapted to penetrate through the openings in the voucher at the coincidence of the sequence of openings in the voucher with the sequence of pegs controlled by said setting means, driving means for actuating said printing device, and means for interrupting the operation of said driving means responsive to the non-coincidence of the openings in the voucher with said pegs of the feeling device.

9. In a machine of the class described, a shiftable printing table, a printing device adapted to print upon a voucher inserted in said table, said voucher having openings therein corresponding to a predetermined system of designations, setting means on said machine corresponding to said system of designations, a feeling device controlled by said setting means comprising a frame pivotally mounted on said printing table and a plurality of disks, each having a plurality of pegs, mounted in said frame, a pinion connected with each of said disks, differentially actuated gears controlled by said setting means, means for rocking said pinions into engagement with said gears at the beginning of the machine operation to correspondingly set said disks and for rocking said frame in the opposite direction against the printing table and the voucher therein after the setting of said disks beyond their normal position, whereby said pegs are capable of penetrating the openings in the voucher at the coincidence of the sequence of openings in the voucher with the sequence of pegs, driving means for actuating said printing device, and means for interrupting the operation of said driving means responsive to the blocking of the complete movement of said pegs by the voucher.

10. In a machine of the class described, a shiftable printing table, a printing device adapted to print upon a voucher inserted in said table, said voucher having openings therein corresponding to a predetermined system of designations, setting means on said machine corresponding to said system of designations, a feeling device controlled by said setting means comprising a frame pivotally mounted on said printing table and a plurality of disks, each having a plurality of pegs, mounted in said frame, a pinion connected with each of said disks, differentially actuated gears controlled by said setting means, means for rocking said pinions into engagement with said gears at the beginning of the machine operation to correspondingly set said disks and for rocking said frame in the opposite directions against the printing table and the voucher therein after the setting of said disks beyond their normal position, whereby said pegs are capable of penetrating the openings in the voucher at the coincidence of the sequence of openings in the voucher with the sequence of pegs, driving means for actuating said printing device, an actuating member controlled by the movement of said frame towards the printing table and the voucher therein, said member adapted to move a greater extent when penetration of the voucher takes place than when said penetration is blocked, and means comprising a cam disk controlled by the movement of said actuating member for interrupting and permitting the operation of said driving means.

11. In a machine of the class described, a shiftable printing table, a printing device adapted to print upon a voucher inserted in said table, said voucher having openings therein corresponding to a predetermined system of designations, setting means on said machine corresponding to said system of designations, a feeling device controlled by said setting means comprising a frame pivotally mounted on said printing table and a plurality of disks, each having a plurality of pegs, mounted in said frame, a pinion connected with each of said disks, differentially actuated gears controlled by setting means, means for rocking said pinions into engagement with said gears at the beginning of the machine operation to correspondingly set said disks and for rocking said frame in the opposite direction against the printing table and the voucher therein after the setting of said disks beyond their normal position, whereby said pegs are capable of penetrating the openings in the voucher at the coincidence of the sequence of openings in the voucher with the sequence of pegs, driving means for actuating said printing device, a toothed segment controlled by the movement of said frame towards the printing table and the voucher therein, said segment adapted to move a greater extent when penetration of the voucher takes place than when said penetration is blocked, a pinion meshing with said toothed segment, a cam groove drum shiftable laterally by said pinion, an arm on said last-mentioned drum, a cam disk having two laterally displaced cams connected with said arm, and means for interrupting and permitting the operation of said driving means in dependency upon the placement of said cam disk.

12. The combination claimed in claim 10 wherein said cam disk is provided with two laterally displaced cams, one of which cams is always operative at the end of the machine operation to arrest said driving means, and the other cam arrests said driving means subsequent to the initiation thereof but prior to operation of said printing device at the non-coincidence of the openings in the voucher with the pegs.

13. The combination claimed in claim 9 wherein said last-mentioned means comprises a cam disk with two laterally displaced cams thereon, a lever controllable by said cams, one of said cams adapted to actuate said lever at the end of every machine operation to arrest said driving means, and the other cam adapted to be rendered effective alternatively to actuate said lever in the course of the machine operation in dependency upon the non-coincidence or coincidence of the openings in the voucher with the pegs, and locking elements for said driving means connected with said lever.

14. In a machine of the class described, a shiftable printing table, a printing device adapted to print upon a voucher inserted in said table, said voucher having openings therein corresponding to a predetermined system of designations, setting means on said machine corresponding to said system of designations, a feeling device controlled by said setting means comprising a frame pivotally mounted on said printing table and a plurality of disks, each having a plurality of pegs, mounted in said frame, a pinion connected with each of said disks, differentially actuated gears controlled by said setting means, means for rocking said pinions into engagement with said gears at the beginning of the machine operation to correspondingly set said disks and for rocking said frame in the opposite direction against the printing table and the voucher therein after the setting of said disks beyond their normal position, whereby said pegs are capable of penetrating the openings in the voucher at the coincidence of the sequence of openings in the voucher with the sequence of pegs, driving means for actuating said printing device comprising a driving motor and a wheel driven thereby, and means for interrupting the operation of said driving means responsive to the blocking of the complete movement of said pegs by the voucher, comprising a cam disk with two laterally displaced cams thereon, a lever controllable by said cams, one of said cams adapted to actuate said lever at the end of every machine operation to arrest said driving means, and the other cam adapted to be rendered effective alternatively to actuate said lever in the course of the machine operation in dependency upon the non-coincidence or coincidence of the openings in the voucher with the pegs, a locking element connected with said lever and cooperable with said wheel and a second locking element connected with said lever and cooperable with said driving motor.

15. In a machine of the class described, a shiftable printing table, a printing device adapted to print upon a voucher inserted in said table, said voucher having openings therein corresponding to a predetermined system of designations, setting means on said machine corresponding to said system of designations, a feeling device controlled by said setting means comprising a frame pivotally mounted on said printing table and a plurality of disks, each having a plurality of pegs, mounted in said frame, a pinion connected with each of said disks, differentially actuated gears controlled by said setting means, means for rocking said pinions into engagement with said gears at the beginning of the machine operation to correspondingly set said disks and for rocking said frame in the opposite direction against the printing table and the voucher therein after the setting of said disks beyond their normal position, whereby said pegs are capable of penetrating the openings in the voucher at the coincidence of the sequence of openings in the voucher with the sequence of pegs, driving means for actuating said printing device comprising a driving motor and a gear wheel driven thereby, two circumferentially displaced stops on said gear wheel, and means for interrupting the operation of said driving means responsive to the blocking of the complete movement of said pegs by the voucher comprising a cam disk with two laterally displaced cams thereon, a lever controllable by said cams, one of said cams adapted to actuate said lever at the end of every machine operation to arrest said driving means, and the other cam adapted to be rendered effective alternatively to actuate said lever in the course of the machine operation in dependency upon the non-coincidence or coincidence of the openings in the voucher with the pegs, a locking arm connected with said lever and adapted to be moved into the path of said stops by said lever, and an additional locking element connected with said lever and cooperable with said driving motor.

16. The combination claimed in claim 9 wherein said last-mentioned means comprises a cam disk with two laterally displaced cams thereon, a lever controllable by said cams, one of said cams adapted to actuate said lever at the end of every machine operation to arrest said driving means and the other cam adapted to be rendered effective alternatively to actuate said lever in the course of the machine operation in dependency upon the non-coincidence or coincidence of the openings in the voucher with the pegs, locking elements for said driving means connected with said lever, a spring for actuating said lever in addition to said cams, and a locking lug cooperating with said lever preventing the operation of said spring.

17. The combination claimed in claim 9 wherein said last-mentioned means comprises a cam disk with two laterally displaced cams thereon, a lever controllable by said cams, one of said cams adapted to actuate said lever at the end of every machine operation to arrest said driving means, and the other cam adapted to be rendered effective alternatively to actuate said lever in the course of the machine operation in dependency upon the non-coincidence or coincidence of the openings in the voucher with the pegs, locking elements for said driving means connected with said lever, a spring for actuating said lever in addition to said cams, a locking lug cooperating with said lever preventing the operation of said spring, and a release key for removing said locking lug from the path of said lever to render said spring effective and to permit the actuation of said lever by said cams.

18. The combination claimed in claim 9 wherein said disks are formed with prismatic lateral surfaces with the pegs fixed therein adapted to contact the voucher for a substantial extent at the penetration of the pegs through the openings of the voucher.

19. In a machine for printing upon cards bearing identifying elements for classifying the same, a printing mechanism adapted to print upon said cards indicia corresponding to said identifying elements, an adjustable feeling mechanism having thereon devices complementary to said identifying elements and adapted to cooperate therewith, a common manually operative setting means for both said mechanisms, driving means for said printing mechanism, and means controlled by said feeling mechanism adapted to disable the drive of said printing mechanism upon occurrence of a disagreement between the devices of said feeling mechanism and said identifying elements.

20. In a machine of the class described, a printing device adapted to print upon a voucher inserted therein, said voucher having identifying elements thereon corresponding to a predetermined system of designations, feeling means cooperating with said identifying elements, manually operative setting means on said machine controlling said printing device and said feeling means, driving means for actuating said printing device, and means for interrupting the operation of said driving means, said feeling means controlling said interrupting means responsive to the non-conformity of the designation formed by the identifying elements on the voucher inserted in the machine with the designation adjusted by said setting means.

HEINZ zur NIEDEN.